No. 714,796. Patented Dec. 2, 1902.
E. N. HALSTEAD.
BRAKE RELEASER.
(Application filed July 8, 1902.)
(No Model.) 2 Sheets—Sheet 1.
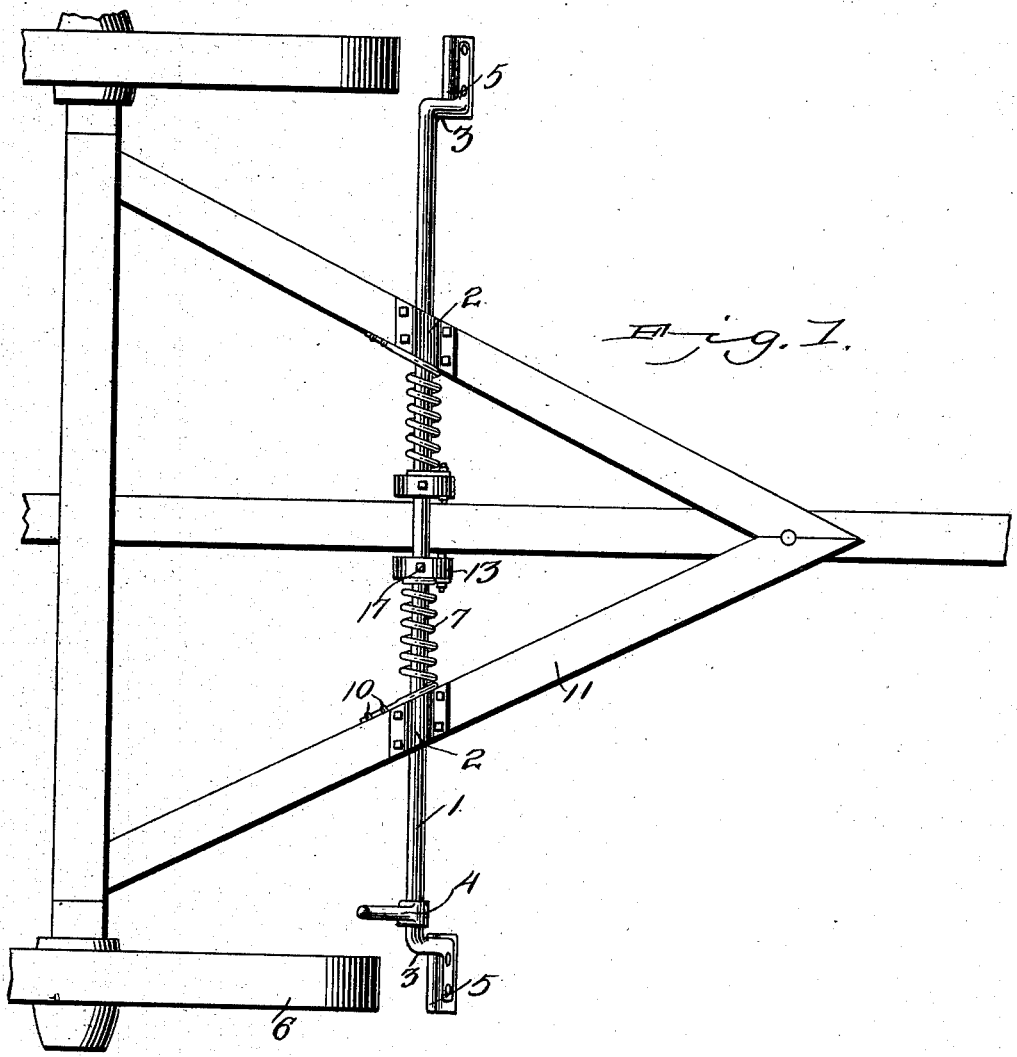
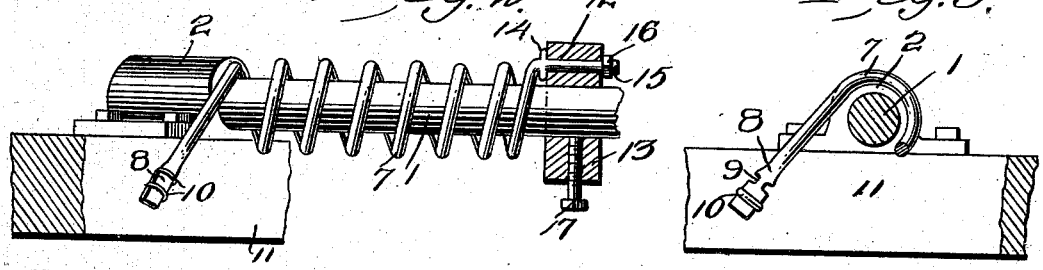
Witnesses  E. N. Halstead, Inventor.
by C. A. Snow & Co.
Attorneys No. 714,796. Patented Dec. 2, 1902.
E. N. HALSTEAD.
BRAKE RELEASER.
(Application filed July 8, 1902.)
(No Model.) 2 Sheets—Sheet 2.
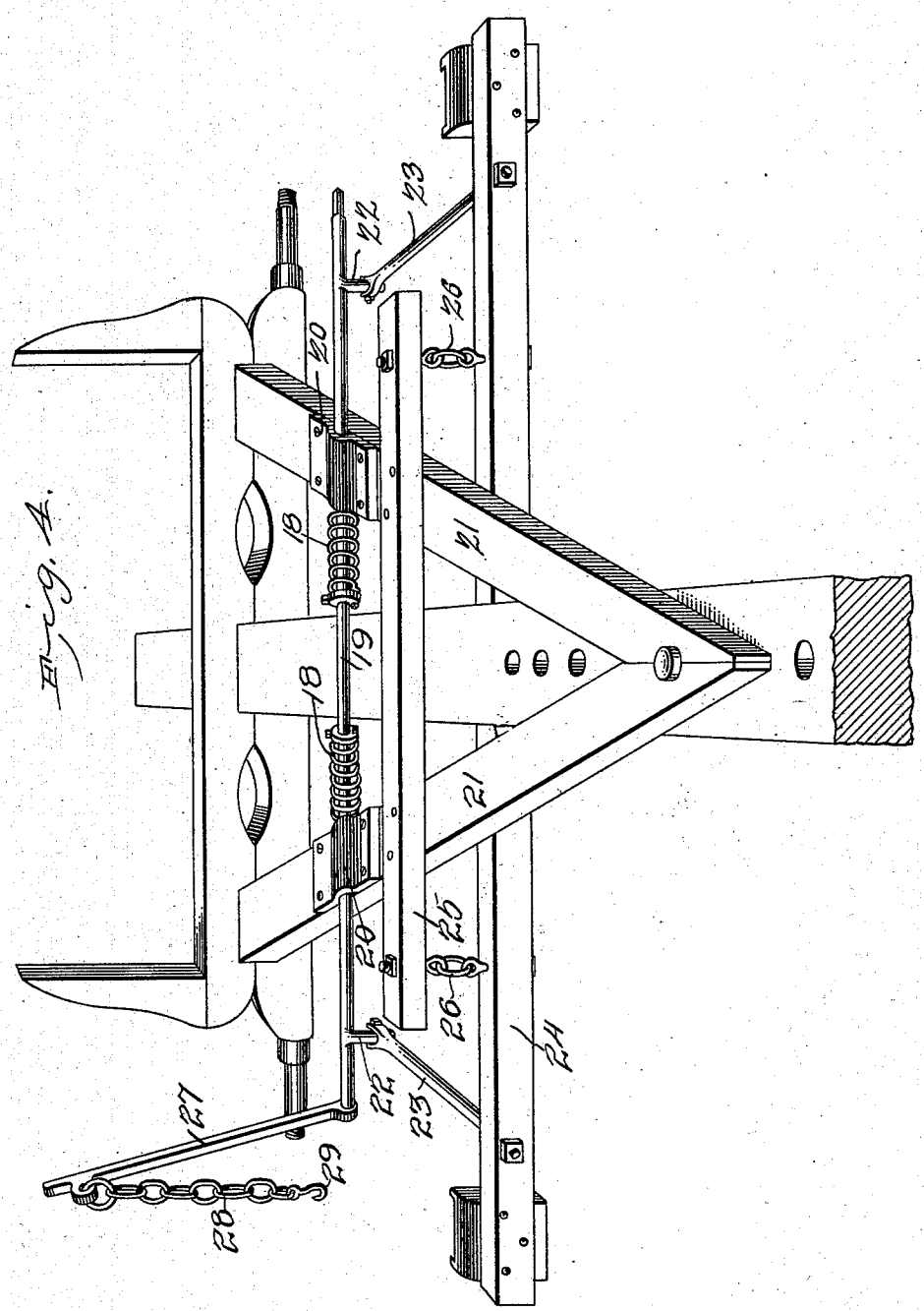
Witnesses
E. N. Halstead, Inventor.
by
Attorneys

UNITED STATES PATENT OFFICE.

ELLIOTT N. HALSTEAD, OF HUNTERS SPRINGS, WEST VIRGINIA, ASSIGNOR OF ONE-HALF TO ISAAC N. BALLARD, OF GREENVILLE, WEST VIRGINIA.

BRAKE-RELEASER.

SPECIFICATION forming part of Letters Patent No. 714,796, dated December 2, 1902.

Application filed July 8, 1902. Serial No. 114,819. (No model.)

*To all whom it may concern:*

Be it known that I, ELLIOTT N. HALSTEAD, a citizen of the United States, residing at Hunters Springs, in the county of Monroe and State of West Virginia, have invented a new and useful Brake-Releaser, of which the following is a specification.

The invention relates to a brake-releaser.

The object of the present invention is to provide a simple, inexpensive, and efficient device adapted to be readily applied to vehicle-brakes and capable of holding the brake-shoes away from the wheels when the brake is not applied to prevent the accumulation of mud on the brake-shoes, which often results when the brake-shoes lie close to the wheels and which increases the labor of pulling a vehicle.

The invention consists in the construction and novel combination and arrangement of parts hereinafter fully described, illustrated in the accompanying drawings, and pointed out in the claim hereto appended.

In the drawings, Figure 1 is a plan view of a portion of a running-gear provided with a brake-releaser constructed in accordance with this invention. Fig. 2 is a detail view of one of the coiled springs, illustrating the manner of attaching the same to the running-gear and to the brake-shaft. Fig. 3 is a detail view of the outer end of the spring, showing the notches which are engaged by the staples or other fastening devices. Fig. 4 is a perspective view of a portion of a running-gear provided with a brake-releasing device constructed in accordance with this invention.

Like numerals of reference designate corresponding parts in all the figures of the drawings.

1 designates a brake-shaft journaled in suitable bearings 2 of the rear hounds and provided at its ends with the usual crank-arms 3 and having an upright arm 4. The crank-arms at the ends of the transverse brake-shaft are provided with suitable brake-shoes 5, which are thrown into engagement with the hind wheels 6 when the arm 4 is swung forward by the brake-operating mechanism. (Not shown.)

In order to hold the brake-shoes normally off the wheels to prevent mud from accumulating on them, coiled springs 7 are employed. One or two coiled springs may be used, and each coiled spring has its outer end 8 enlarged and flattened and provided with opposite notches 9, which are adapted to be engaged by staples 10 for securing the outer end of the spring to the rear hound 11. The inner end 12 of the spring is bent at an angle and arranged longitudinally of the brake-shaft, being passed through a perforation of an adjustable disk 13. The end 12 of the spring is provided at one face of the disk with a shoulder 14, and it is threaded at 15 at the other face of the disk for the reception of a nut 16. By this construction the spring is securely attached to the disk, which is capable of rotation to arrange the spring at the desired tension. The disk is provided with a central opening for the reception of the shaft, and it is secured at the desired adjustment by means of a set-screw 17, arranged in a threaded perforation of the disk and engaging the shaft. The said screw is provided at its outer end with a suitable head and is adapted to be operated by a wrench or other tool. The springs, which may be arranged in suitable casings, are located between the rear hounds and the reach and will be protected by the same.

The springs are adapted to hold the brake-shoes away from the hind wheels to prevent the accumulation of mud on the brake-shoes, and by this construction the upright arm of the brake-shaft may be connected with the operating-lever by means of a chain or any other suitable connection, a rod not being necessary, as is the case with the ordinary vehicle-brake where the operating-lever is employed for holding the brake-shoes off the wheels. This construction will also facilitate the removal of a wagon-body from its running-gear, as a hook may be employed for engaging the upright arm of the brake-shaft instead of the bolt and nut which are used for connecting a rod with the arm of the brake-shaft.

It will be seen that the device is exceedingly simple and inexpensive in construction, that it is adapted to be readily applied to an ordinary vehicle-brake, and that it will normally hold the brake-shoes off the wheels and enable a flexible connection, such as a chain, to be employed for connecting the brake-operating lever with the arm of the rock-shaft. It will also be seen that when the upright arm of the rock-shaft is swung forward in applying the brake the springs will be placed under tension and will automatically throw the brake-shoes off the wheels as soon as they are free to operate.

In Fig. 4 of the drawings is illustrated a slight modification of the invention, in which the coiled springs 18 are arranged on a rock-shaft 19, journaled in suitable bearings 20 of the rear hounds 21 and provided with depending arms 22. The depending arms 22 are connected by links or rods 23 with a transverse brake-beam 24, provided at its ends with suitable brake-shoes and suspended from a transverse bar 25 by short chains or flexible connections 26, preferably consisting of a link and a pair of eyebolts, as shown; but any other connecting device may be employed. The springs 18 are constructed the same as those heretofore described, and the rock-shaft 19 is provided with an upwardly-extending arm 27, secured to a chain 28. The chain 28 terminates in a hook 29 and is designed to be connected with operating mechanism. The springs, which are made right and left, as shown, may be provided at their outer enlarged ends with perforations for enabling them to be bolted to the hounds in addition to being secured by the staples. When the brake-operating mechanism is released, the springs 18 operate similar to those heretofore described and throw the brake-shoes off the wheels.

The construction shown in Fig. 1 is adapted for light vehicles, and the arrangement illustrated in Fig. 4 is especially designed for heavy wagons and similar vehicles.

What I claim is—

In a device of the class described the combination with a running-gear, of a brake having a rock-shaft mounted on the rear hounds of the running-gear and extending across the same, a coiled spring arranged on the rock-shaft between the reach and one of the rear hounds and having extended inner and outer ends, the inner end being disposed longitudinally of the spring and provided at the inner portion with a shoulder or enlargement 14 and having the outer portion threaded, and the outer end of the spring being enlarged and arranged on one of the faces of the adjacent hound and provided with opposite notches, an approximately U-shaped fastening device mounted on the said hound and embracing the enlarged end of the spring and interlocked with the notches thereof, a block arranged on the rock-shaft at the inner end of the spring and having a transverse perforation receiving the inner extension, a clamp securely mounted on the block and engaging the shaft to secure the block to the same, and a nut engaging the threaded portion of the inner extension of the spring, substantially as described.

In testimony that I claim the foregoing as my own I have hereto affixed my signature in the presence of two witnesses.

ELLIOTT N. HALSTEAD.

Witnesses:
R. H. ARNOTT,
S. M. MANN.